US007398846B2

(12) United States Patent
Young et al.

(10) Patent No.: US 7,398,846 B2
(45) Date of Patent: Jul. 15, 2008

(54) VEHICLE WHEEL SYSTEM

(75) Inventors: David A. Young, Huntington Woods, MI (US); Mohsen D. Shabana, Farmington Hills, MI (US); Christopher E. Borroni-Bird, Oakland Township, MI (US); Adrian B. Chernoff, Royal Oak, MI (US); Robert L. Vitale, Macomb Township, MI (US); Bruce Edward Zemke, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/223,816

(22) Filed: Sep. 9, 2005

(65) Prior Publication Data

US 2006/0048994 A1    Mar. 9, 2006

Related U.S. Application Data

(63) Continuation-in-part of application No. 10/309,786, filed on Dec. 4, 2002.

(60) Provisional application No. 60/608,585, filed on Sep. 10, 2004, provisional application No. 60/337,994, filed on Dec. 7, 2001.

(51) Int. Cl.
*B60G 17/01* (2006.01)

(52) U.S. Cl. ............. 180/65.5; 188/156; 310/67 R

(58) Field of Classification Search .............. 180/65.5, 180/65.1, 402, 403, 411, 432, 435, 443–446, 180/252, 253; 188/156, 159; 310/67 R, 310/93
See application file for complete search history.

(56) References Cited

U.S. PATENT DOCUMENTS

| 2,039,513 | A | * | 5/1936 | Baker ..................... 180/65.5 |
| 2,506,146 | A | * | 5/1950 | Gladish ................. 310/67 R |
| 3,792,742 | A | * | 2/1974 | Mager ..................... 180/65.5 |
| 4,913,258 | A | * | 4/1990 | Sakurai et al. ............ 180/242 |
| 5,058,016 | A | * | 10/1991 | Davidovitch .............. 701/22 |
| 5,438,228 | A | * | 8/1995 | Couture et al. .......... 310/67 R |
| 5,924,506 | A | * | 7/1999 | Perego .................... 180/65.5 |
| 6,113,119 | A | * | 9/2000 | Laurent et al. .......... 280/124.1 |
| 6,260,645 | B1 | * | 7/2001 | Pawlowski et al. ........ 180/65.3 |

FOREIGN PATENT DOCUMENTS

| JP | 5-338446 | * | 12/1993 |
| WO | WO00/38939 | * | 7/2000 |

* cited by examiner

*Primary Examiner*—Anne Marie M. Boehler

(57) ABSTRACT

A wheel assembly for a vehicle includes a rotatable wheel having a selectively adjustable steering angle. A steering actuator is operatively connected to the wheel and is configured to selectively adjust the steering angle of the wheel and not any other wheels. The wheel assembly allows independent control of the steering angle of the wheel. The wheel assembly also facilitates modular construction of vehicles by enabling the packaging of mechanical steering components in a preassembled wheel module with simple electrical connections to a vehicle chassis.

2 Claims, 4 Drawing Sheets

US 7,398,846 B2

VEHICLE WHEEL SYSTEM

CROSS REFERENCE TO RELATED APPLICATIONS

This application is a continuation in part of U.S. patent application Ser. No. 10/309,786, filed Dec. 4, 2002, which claims the benefit of U.S. Provisional Patent Application No. 60/337,994, filed Dec. 7, 2001; this application also claims the benefit of U.S. Provisional Patent Application No. 60/608,585, filed Sep. 10, 2004; each of the aforementioned patent applications is hereby incorporated by reference in its entirety.

TECHNICAL FIELD

This invention relates to steering actuators for vehicle wheels.

BACKGROUND OF THE INVENTION

Prior art vehicles typically include a steering system to alter the steering angle of the two front road wheels to alter the direction of vehicle movement. Typical prior art steering systems include an input device such as a steering wheel that is connected by a series of mechanical linkages to the two front wheels. Accordingly, the two front road wheels are mechanically interconnected by the mechanical steering linkages so that the steering angle of one of the front wheels is dependent upon the steering angle of the other front wheel. The mechanical linkages span between the two front wheels, occupying packaging space within the vehicle front compartment with an engine and other vehicle components.

SUMMARY OF THE INVENTION

A wheel assembly for a vehicle includes a nonrotatable member, such as a chassis frame or a suspension. A wheel is rotatably connected with respect to the nonrotatable member and characterized by a selectively adjustable steering angle with respect to the nonrotatable member. A steering actuator is operatively connected to the wheel and is configured to selectively alter the steering angle of the wheel. The steering actuator is configured to adjust the steering angle of only the one wheel.

The wheel assembly allows independent control of the steering angle of the wheel. The wheel assembly also facilitates modular construction of vehicles by enabling the packaging of mechanical steering components in a preassembled module with simple electrical connections to a vehicle chassis.

A vehicle is also provided with wheels and two steering actuators. A first steering actuator is operatively connected to a first wheel to selectively alter the steering angle of the first wheel. A second steering actuator is operatively connected to a second wheel to selectively alter the steering angle of the second wheel. Separate and independent steering actuators for each of the two wheels eliminates a steering rack extending between the wheels and thus provides increased packaging space compared to the prior art. Independent control of the steering angles of the rear wheels may provide enhanced vehicle dynamic control.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
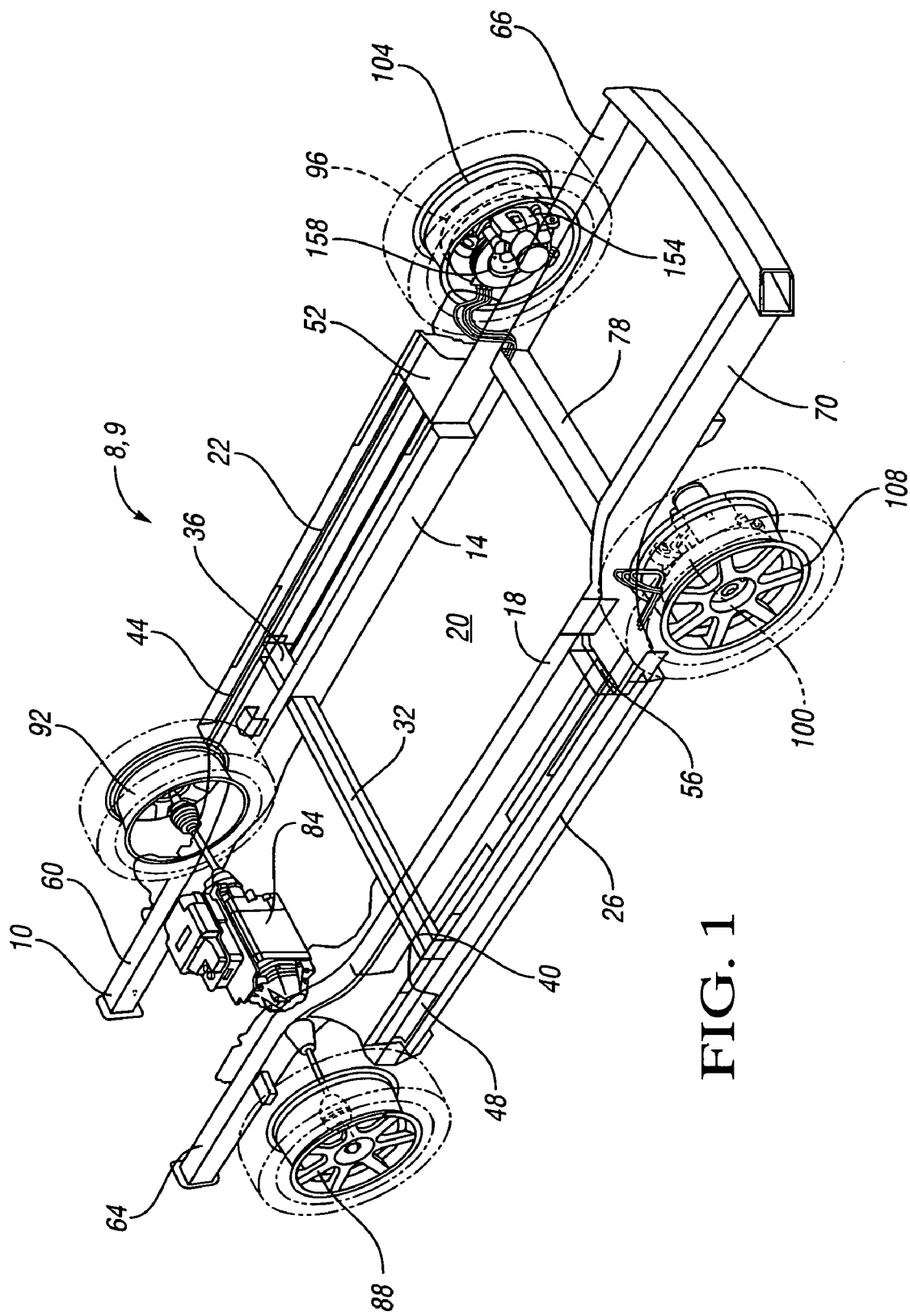
FIG. 1 is a schematic perspective view of a vehicle chassis.

Referring to FIG. 1, a portion of a chassis 8 for a vehicle 9 is schematically depicted. The chassis 8 includes a structural frame 10. The frame includes a first rail 14 and a second rail 18 that are longitudinally oriented and that are spaced a distance apart from one another to form a central cavity 20 therebetween. A third rail 22 is outboard of the first rail 14. A fourth rail 26 is outboard of the second rail 18.

Cross member 32 rigidly interconnects the first and second rails 14, 18. Cross member 36 rigidly interconnects the first and third rails 14, 22. Cross member 40 rigidly interconnects the second and fourth rails 18, 26.

The frame 10 also includes a first node 44, a second node 48, a third node 52, and a fourth node 56. The nodes, which are preferably cast, substantially rigidly interconnect various members of frame 10. More specifically, the first node 44 interconnects a first front member 60 with the first rail 14 and the third rail 22. The second node 48 interconnects a second front member 64 with the second rail 18 and the fourth rail 26. The third node 52 interconnects a first rear frame member 66 to the first and third rails 14, 22. The fourth node 56 interconnects a second rear frame member 70 to the second and fourth rails 18, 26. Cross member 78 connects the third and fourth nodes 52, 56. Those skilled in the art will recognize other frame configurations that may be employed within the scope of the claimed invention. For example, when body-frame integral construction, also sometimes referred to as "unibody" construction, is employed, the body of the vehicle may be considered a "frame."

The chassis 8 also includes traction motor 84, which is operatively connected to front wheels 88, 92. In a preferred embodiment, the chassis includes a fuel cell (not shown) to generate electrical energy to power the traction motor 84, though other sources of electrical energy may be employed within the scope of the claimed invention. Individual rear wheel hub motors 96, 100 drive rear wheels 104, 108, respectively. The front wheels 88, 92 are rotatably mounted with respect to the frame 10 via a front suspension system. Rear wheels 104, 108 are rotatably mounted with respect to the frame 10 via a rear suspension system (shown at 112 in FIGS. 2-4). The wheels each have a tire mounted thereon. An exemplary wheel hub motor, and its relationship with respect to a wheel and suspension system, is shown and described in commonly-assigned, copending U.S. patent application Ser. No. 10/309,786, filed Dec. 4, 2002, and which is hereby incorporated by reference in its entirety.

Figure 2:
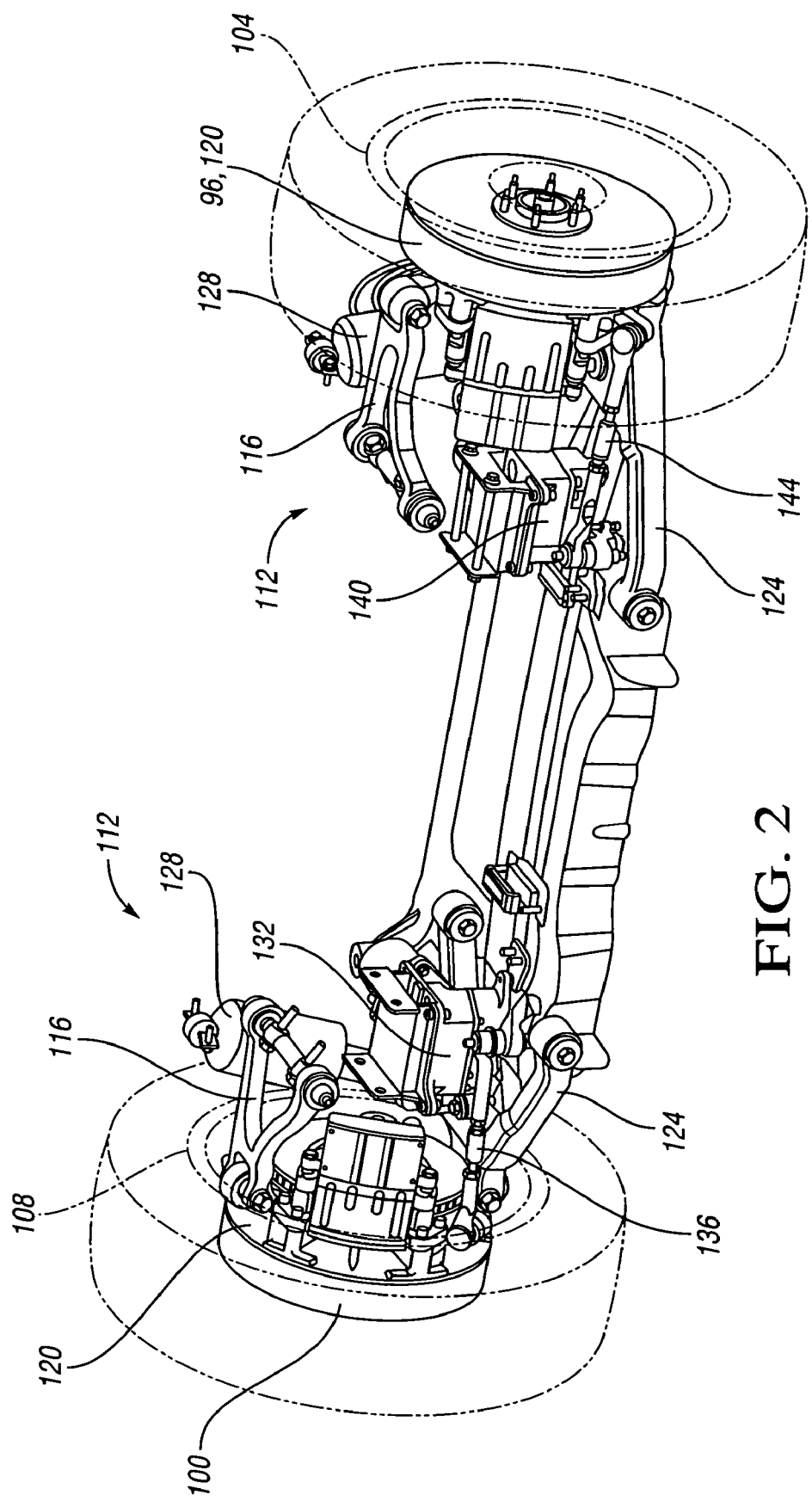
FIG. 2 is a schematic perspective view of the rear wheels and suspension of the chassis of FIG. 1.

Referring to FIG. 2, rear suspension system 112 includes two upper control arms 116, each being pivotably connected with respect to a respective one of the wheel motor housings 120. The suspension system 112 includes two lower control arms 124, each being pivotably connected with respect to a respective one of the wheel motor housings 120. Shock absorbers 128 are operatively connected with respect to the upper and lower control arms 116, 124.

Each motor 96, 100 includes a respective rotor (not shown) protruding from the outboard side of its respective housing 120 and rigidly mounted with respect to a respective wheel 104, 108 to selectively rotate the wheel. Each rear wheel 104, 108 is characterized by by-wire steering. A first rear steering actuator 132, such as a servomotor or solenoid, is connected to rear wheel 108 via linkage 136 and motor housing 120 to selectively alter the steering angle of rear wheel 108. A second rear steering actuator 140 is connected to rear wheel 104 via linkage 144 and motor housing 120 to selectively alter the steering angle of rear wheel 104. Thus, separate steering actuators 132, 140 control the respective steering angle of each rear wheel independently, eliminating the need for a steering rod to extend between the two rear wheels and therefore increasing packaging space in the vehicle to accommodate, for example, a hybrid vehicle battery (not shown), which may be at least partially between the rear wheels 104, 108. Separate and independently controllable actuators for the rear wheels may also provide enhanced vehicle dynamic control. Similarly, independent steering actuators may also be employed with the front wheels (shown at 88, 92 in FIG. 1).

Figure 3:
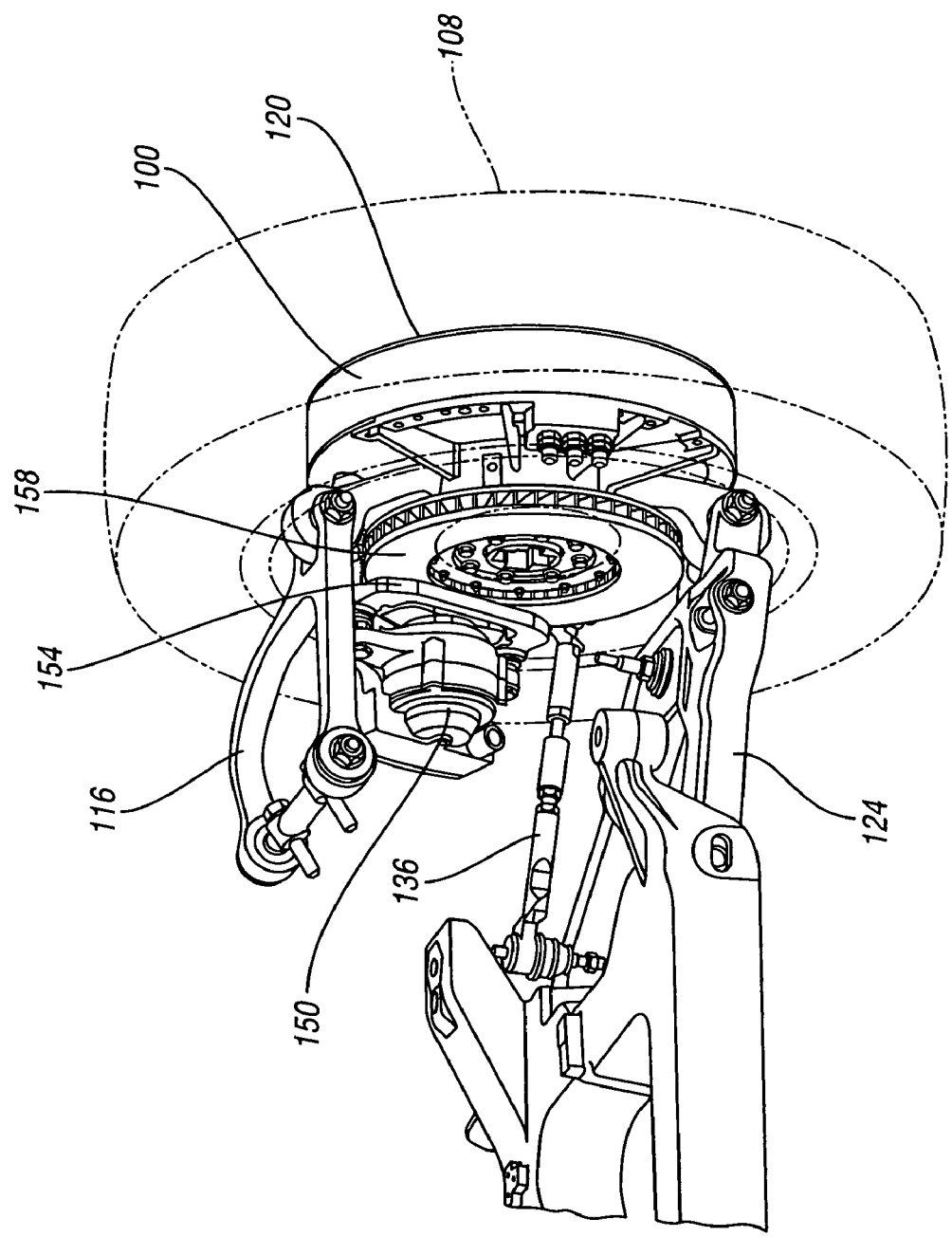
FIG. 3 is a schematic perspective view of one of the rear wheels of FIG. 2.
Figure 4:
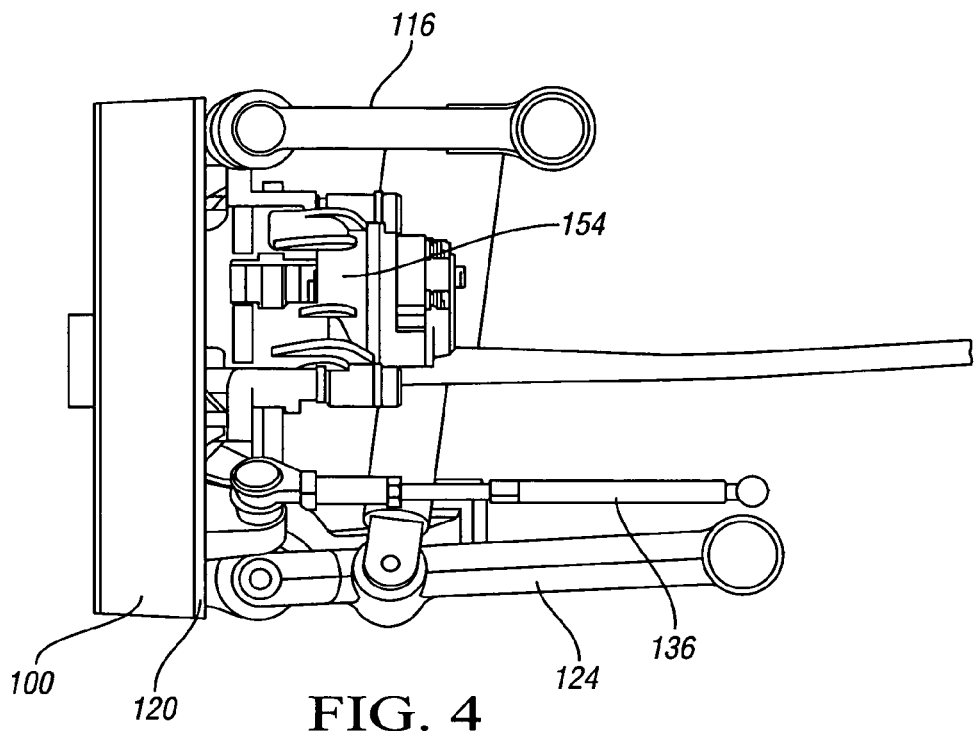
FIG. 4 is a schematic rear view of the rear wheel of FIG. 3.

Referring specifically to FIG. 3, the vehicle includes a by-wire braking system for all four wheels. A by-wire brake actuator 150 is configured to selectively cause calipers 154 to engage disc 158 to resist or prevent rotation of wheel 108. More specifically, calipers 154 are a first friction element that is rigidly mounted with respect to the motor housing 120 and chassis 10, i.e., nonrotating members. The disc 158 is rigidly mounted with respect to the rotor of the motor 100 and the wheel 108 for rotation therewith. The actuator 150 is configured to selectively cause the calipers to contact the disc to create friction and thereby resist the rotation of the wheel 108 with respect to the nonrotating members.

The calipers 154, actuator 150, and disc 158 are inboard of wheel motor 100 and the corresponding wheel bearing assembly. It should be noted that the use of the wheel motors enables all-wheel drive, in conjunction with the traction motor, with minimal effect on the packaging space between the rear wheels.

Figure 5:
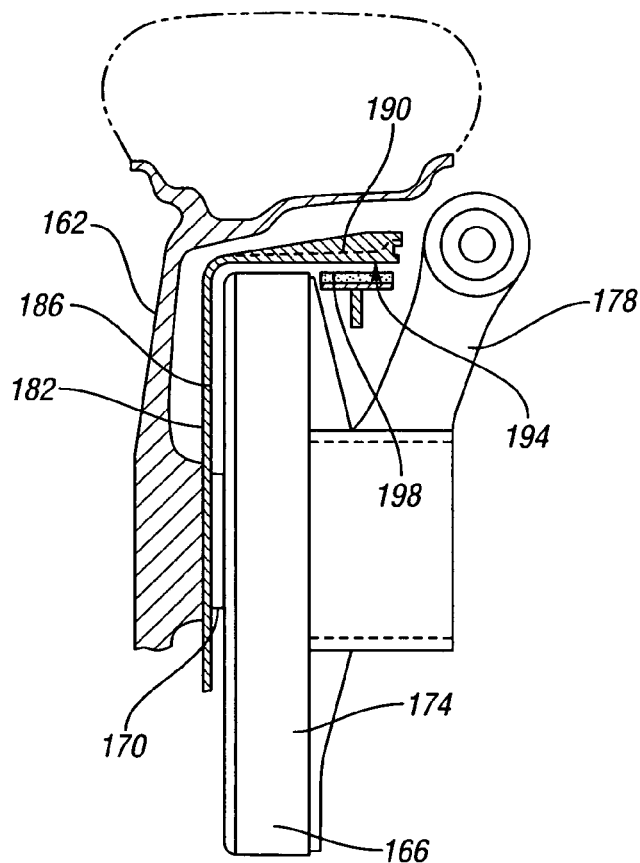
FIG. 5 is a schematic cross sectional view of an alternative wheel arrangement in accordance with the present invention.

Referring to FIG. 5, an alternative brake design is schematically depicted. Wheel 162 has a wheel motor 166 contained therein. The rotor 170 of the wheel motor 166 is connected to the wheel 162 to selectively cause the rotation thereof. The wheel motor housing 174 is connected to suspension 178. A drum member 182 is connected to the rotor 170 and the wheel 162 for rotation therewith. The drum member 182 includes a portion 186 that extends radially on the outboard side of the wheel motor 166, and a portion 190 that extends axially from the outboard side of the motor to the inboard side of the motor. Portion 190 defines inner surface 194. A brake shoe 198 is mounted with respect to suspension 178 and housing 174, and is selectively movable into contact with surface 194 to provide friction resistance to the rotation of the drum 182 and, therefore, wheel 162. Accordingly, drum 182, and more particularly, surface 194, is a first friction element positioned inboard of the wheel motor 166, and shoe 198 is a second friction element positioned inboard of the wheel motor 166. Locating the brake elements inboard of the wheel motor and bearing assembly facilitates satisfaction of wheel-to-curb design criteria while maintaining satisfactory suspension geometry.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a vehicle chassis frame;
   a wheel being rotatably mounted with respect to the vehicle frame;
   a wheel motor having a housing at least partially contained within the wheel; and
   a brake system including a drum member being mounted with respect to the wheel for rotation therewith and having a first portion that extends radially on the outboard side of the wheel motor housing and a second portion that extends axially from the outboard side of the housing to the inboard side of the housing, said second portion defining a friction surface on the inboard side of the housing; and
   a brake shoe configured to selectively engage the friction surface.

2. The vehicle of claim 1, further comprising a by-wire actuator configured to selectively cause the shoe to contact the friction surface.

* * * * *